United States Patent
Heide et al.

(10) Patent No.: US 11,753,812 B2
(45) Date of Patent: Sep. 12, 2023

(54) DIRECT GREASE AND/OR SOLIDS COLLECTION SYSTEM

(71) Applicant: Schier Products Company, Shawnee, KS (US)

(72) Inventors: Grahm Heide, Overland Park, KS (US); Barry Gilman, Platte City, MO (US); Robert Good, Overland Park, KS (US); Luke J. Ismert, Prairie Village, KS (US)

(73) Assignee: Schier Products Company, Shawnee, KS (US)

( * ) Notice: Subject to any disclaimer, the term of this patent is extended or adjusted under 35 U.S.C. 154(b) by 0 days.

(21) Appl. No.: 17/491,139

(22) Filed: Sep. 30, 2021

(65) Prior Publication Data

US 2022/0098847 A1  Mar. 31, 2022

Related U.S. Application Data (60) Provisional application No. 63/085,201, filed on Sep. 30, 2020.

(51) Int. Cl.
| | |
|---|---|
| *E03F 5/16* | (2006.01) |
| *C02F 1/40* | (2023.01) |
| *B01D 17/02* | (2006.01) |
| *C02F 101/32* | (2006.01) |

(52) U.S. Cl.
CPC ............ *E03F 5/16* (2013.01); *B01D 17/0214* (2013.01); *C02F 1/40* (2013.01); *C02F 2101/32* (2013.01)

(58) Field of Classification Search
CPC ...... E03C 1/26; E03F 5/14; E03F 5/16; B01D 17/0214; C02F 1/40; C02F 2101/32; C02F 1/001; C02F 2201/004; C02F 2307/08
USPC ....... 210/163, 164, 299, 308, 309, 463, 538; 4/679, 286, 290, 292
See application file for complete search history.

(56) References Cited

U.S. PATENT DOCUMENTS

| | | | |
|---|---|---|---|
| 965,836 A | 7/1910 | Ray | |
| 1,756,290 A * | 4/1930 | Hibner | E03C 1/264 |
| | | | 4/289 |
| 1,856,099 A * | 5/1932 | Hertsch | E03F 5/16 |
| | | | 210/538 |
| 2,690,232 A * | 9/1954 | Paulbrem | E03C 1/282 |
| | | | 210/299 |
| 2,846,154 A | 8/1958 | Wieczorek | |
| 2,868,465 A | 1/1959 | Wieczorek | |
| 2,875,958 A | 3/1959 | Wieczorek | |
| 2,917,246 A | 12/1959 | Wieczorek | |
| 3,025,007 A | 3/1962 | Wieczorek | |
| 3,144,408 A * | 8/1964 | Pascual | E03C 1/264 |
| | | | 210/538 |
| 3,322,282 A * | 5/1967 | Lyman | A47L 15/4206 |
| | | | 210/308 |
| 5,271,108 A | 12/1993 | Wicke | |
| 5,372,718 A | 12/1994 | Zebian | |

(Continued)

*Primary Examiner* — Joseph W Drodge
(74) *Attorney, Agent, or Firm* — Hovey Williams LLP (57) ABSTRACT

Described herein is a grease and/or solids collection system that can be installed directly below a sink basin. The system generally comprises an insert cartridge for collecting both solids and grease contained in wastewater draining from the sink. The cartridge can be easily removed through the sink drain, emptied, and reinstalled, for example, using a handle positioned at the top of the cartridge and accessible through the sink drain.

20 Claims, 9 Drawing Sheets

(56) References Cited

U.S. PATENT DOCUMENTS

| | | | |
|---|---|---|---|
| 6,860,991 B1 * | 3/2005 | Hagon | E03C 1/29 4/679 |
| 7,500,626 B2 | 3/2009 | Berger et al. | |
| 7,918,411 B2 | 4/2011 | Anderson et al. | |
| 7,963,469 B2 | 6/2011 | Hanson | |
| 8,220,731 B2 | 7/2012 | Berger et al. | |
| 8,763,170 B1 * | 7/2014 | Ungarsohn | E03C 1/262 4/292 |
| 9,139,990 B2 | 9/2015 | Bennage | |
| 9,145,666 B2 | 9/2015 | Hammer | |
| 9,267,626 B2 | 2/2016 | Falcone | |
| 9,968,940 B2 | 5/2018 | Hartmann et al. | |
| 11,123,657 B1 * | 9/2021 | Meher | B01D 17/0211 |
| 2002/0170864 A1 * | 11/2002 | Batten | B01D 21/0042 210/803 |
| 2006/0076289 A1 | 4/2006 | Weymouth | |
| 2007/0251879 A1 | 11/2007 | Batten et al. | |
| 2021/0017745 A1 | 1/2021 | Paweleck et al. | |
| 2021/0239247 A1 * | 8/2021 | Brown | B01D 21/0006 |

* cited by examiner

DIRECT GREASE AND/OR SOLIDS COLLECTION SYSTEM

CROSS-REFERENCE TO RELATED APPLICATIONS

The present application claims the priority benefit of U.S. Provisional Patent Application Ser. No. 63/085,201, filed Sep. 30, 2020, entitled DIRECT GREASE AND/OR SOLIDS COLLECTION SYSTEM, incorporated by reference in its entirety herein.

BACKGROUND

Field of the Invention

Embodiments of the present invention are generally directed to a compact grease and/or solids collection and removal system, which can be easily installed and cleaned without the need for professional service on commercial or residential sinks.

Description of Related Art

Professional installation and the cleaning out of grease traps is a significant cost, and thus a significant barrier to grease trap sales. Therefore, there is a need for a grease collection and removal system that removes this cost component, offering a substantial savings and convenience to the customer, which will increase the number of food service establishments that can afford them. Additionally, currently there is no grease capturing solution available on the market to protect residential pipes. Further, there is a need for direct capture and removal of various other solids, both in commercial and residential sinks, such as to prevent these solids from entering the municipal water treatment system and/or septic.

SUMMARY OF THE INVENTION

Provided herein is a grease and/or solids collection system that addresses the problems of prior systems described above. The system is easily installed without the need for a professional plumber or professional grease trap cleaning and is capable of separately collecting solids and grease removed from a wastewater stream. Moreover, the system is smaller than prior grease traps and is installed directly below a sink bowl unit. Thus, the system is directly coupled to the bottom of the sink bowl unit, e.g., at the sink drain. This permits the system to be cleaned by the user in mere seconds, also without the need of a professional or commercial cleaning or plumbing service, which allows for quick and frequent maintenance (as opposed to the time-intensive infrequent maintenance of prior art systems).

The system generally comprises an insert cartridge for collecting both solids and grease removed from the wastewater stream. The cartridge can be easily removed and emptied when the cartridge is full. Moreover, the cartridge is strategically sized so that "when to maintain" is indicated when the solids slow drain flow.

In one embodiment, there is provided a grease and/or solids collection system configured to be coupled with a sink basin. The system comprises a wastewater chamber configured to be secured to the sink basin and a grease and/or solids collection insert configured to be installed within the wastewater chamber and removed through a drain in the sink basin.

In one embodiment, there is provided a method of collecting grease and/or solids from wastewater. The method comprises draining the wastewater into a grease and solids collection system coupled with a sink basin. The system comprises a wastewater chamber secured to the sink basin and a grease and/or solids collection insert installed within the wastewater chamber. The method further comprises removing the insert through a drain in the sink basin, thereby removing a quantity of grease and/or solids collected during the draining.

DETAILED DESCRIPTION OF EXEMPLARY EMBODIMENTS

Figure 1:
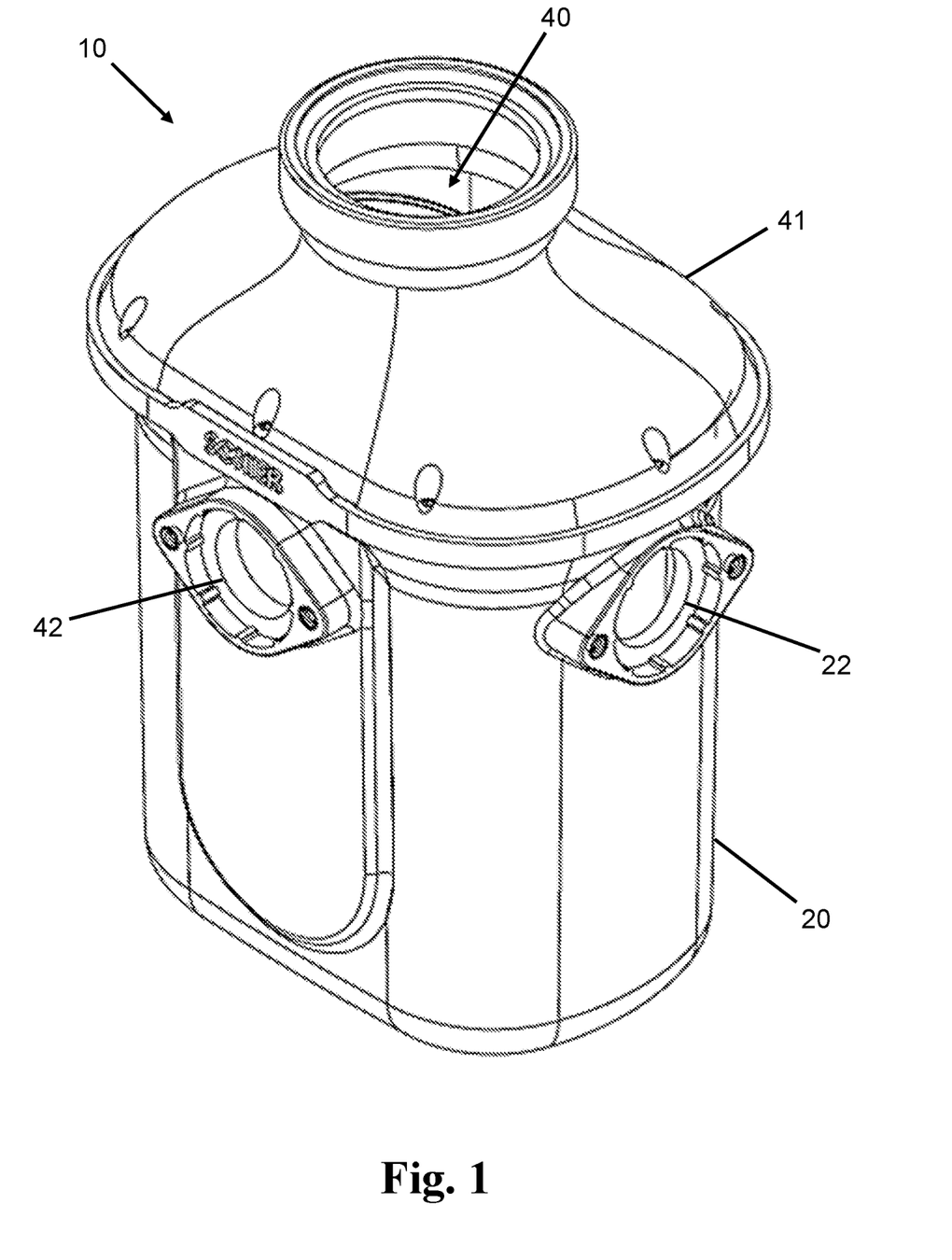
FIG. 1 is a perspective view of a grease and/or solids collection system in accordance with one embodiment of the present invention.

An exemplary grease and/or solids collection system 10 is shown in FIG. 1. Collection system 10 generally comprises a lower housing chamber 20 and a lid 41 defining an upper housing chamber 40 configured to receive a grease and/or solids collection insert cartridge 60 (see FIG. 2). The collection system 10 is generally configured to be installed below a sink, such that the sink drain directs the effluent flow from the sink through the cartridge 60 and into the collection system 10. Lower housing chamber 20 comprises an effluent outlet 22, wherein the de-greased water flows out of the collection system 10 to downstream plumbing, septic, or further water treatment system(s). In certain embodiments, lower housing chamber 20 may further comprise one or more secondary inlets 42, in which wastewater from an adjacent sink drain may be directed into lower housing chamber 20 and eventually out of the system 10 via the effluent outlet 22 along with the de-greased water. Although FIG. 1 shows a single outlet 22 and a single secondary inlet 42, it should be understood that multiple outlets and/or secondary inlets may also be formed around lower housing chamber 20, as needed or desired. Additionally, in certain embodiments, the positions of secondary inlet 42 and effluent outlet 22 may be reversed, such that the port shown for secondary inlet 42 functions as effluent outlet 22 and the port shown for effluent outlet 22 functions as secondary inlet secondary inlet 42. This advantageously allows for versatility for the system 10 to be installed with different sink configurations. Additionally or alternatively, the lid 41 may comprise a dedicated dishwasher port (not shown) formed therein where wastewater may be fed into the upper chamber 40.

Figure 2:
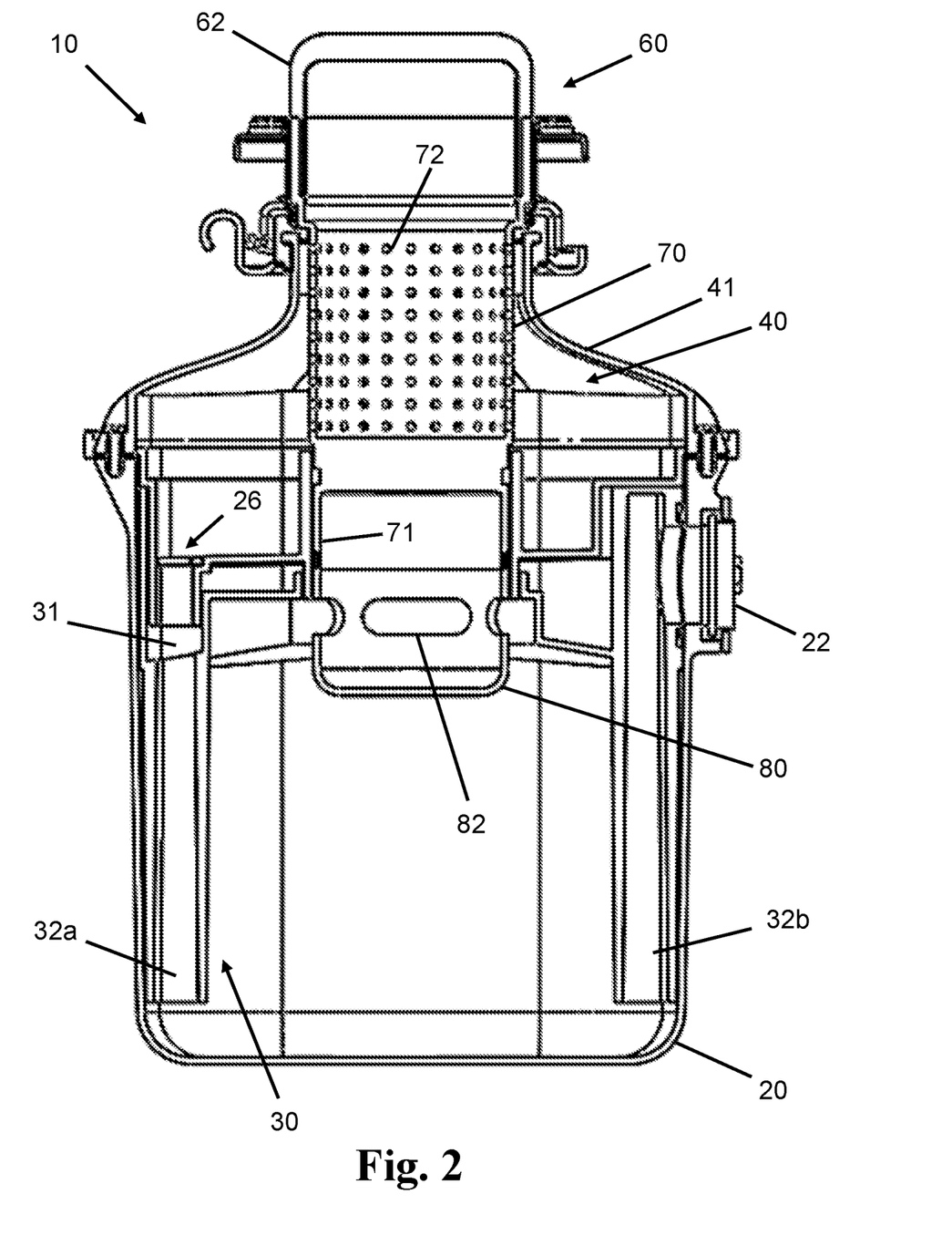
FIG. 2 is a cross-section view of a grease and/or solids collection system in accordance with one embodiment of the present invention.

FIG. 2 illustrates a cross-section of the embodiment of FIG. 1, illustrating the internal components of the grease collection system 10. The insert cartridge 60 generally comprises an upper solids collection portion 70 and a lower grease collection portion 80. When installed, the upper solids collection portion 70 resides within the upper housing chamber 40 and can extend at least partially into the lower housing chamber 20. The solids collection portion 70 may include a projection 71 that extends into the lower housing chamber 20, which may be removably attached to lower grease collection portion 80. Lower housing chamber 20 comprises a diffuser assembly 30 installed therein, which may include one or more vertical diffuser inserts 32a, 32b that act to direct the flow of liquid and facilitate separation of grease from water.

Figure 3:
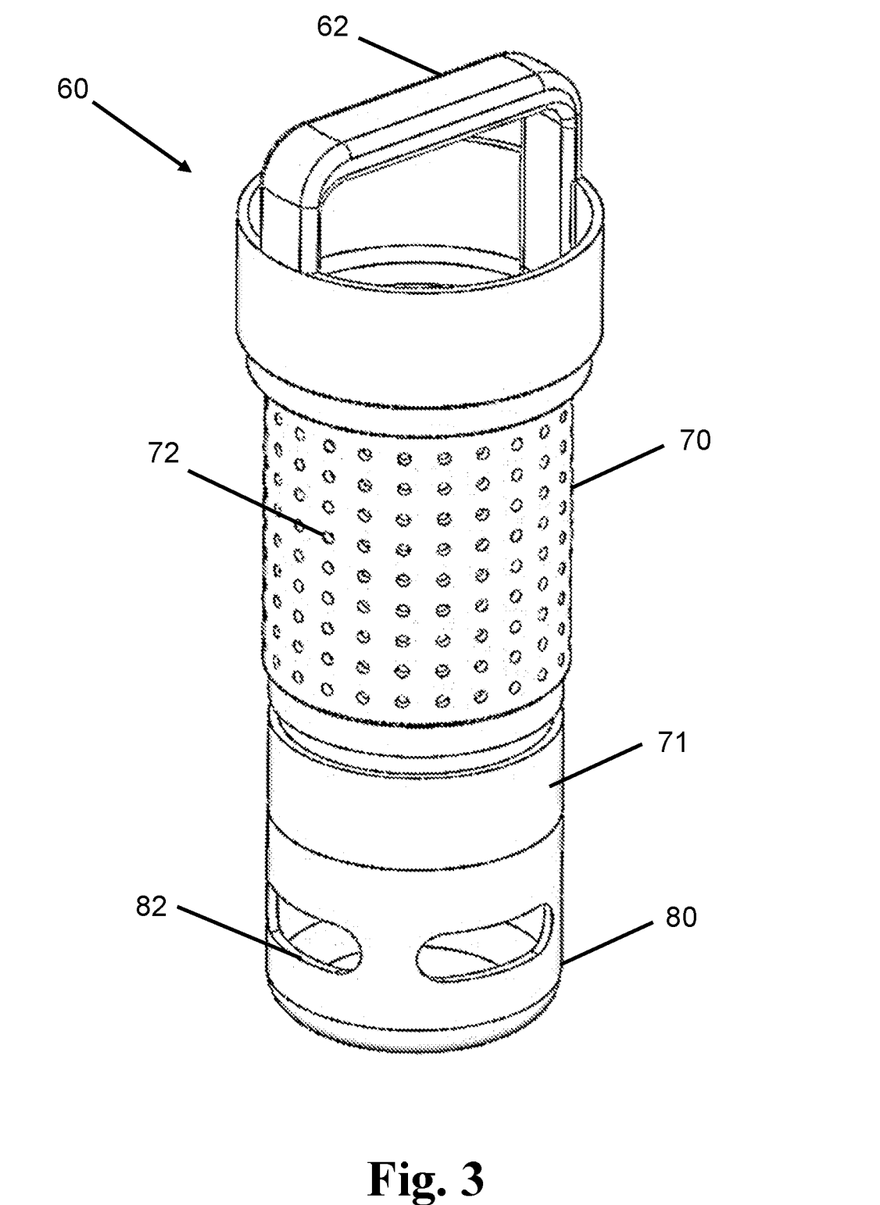
FIG. 3 is a perspective view of an insert cartridge in accordance with one embodiment of the present invention.

As shown in FIG. 3, insert cartridge 60 comprises upper solids collection portion 70 and lower grease collection portion 80. In certain embodiments, upper solids collection portion 70 can be removably secured to lower grease collection portion 80 using any of a variety of attachment mechanisms (threaded, snap fit, etc.), which allows the cartridge 60 to be separated so that the solids portion and grease portion can be cleaned separately when removed, before being re-attached and installed together back into the grease collection system. However, in certain embodiments, upper solids collection portion 70 and lower grease collection 80 may comprise a unitary construction. The entirety of the insert cartridge 60 may be installed (lowered) or removed (raised) through the sink drain using a handle 62 affixed to the top of the solids collection portion.

Figure 4:
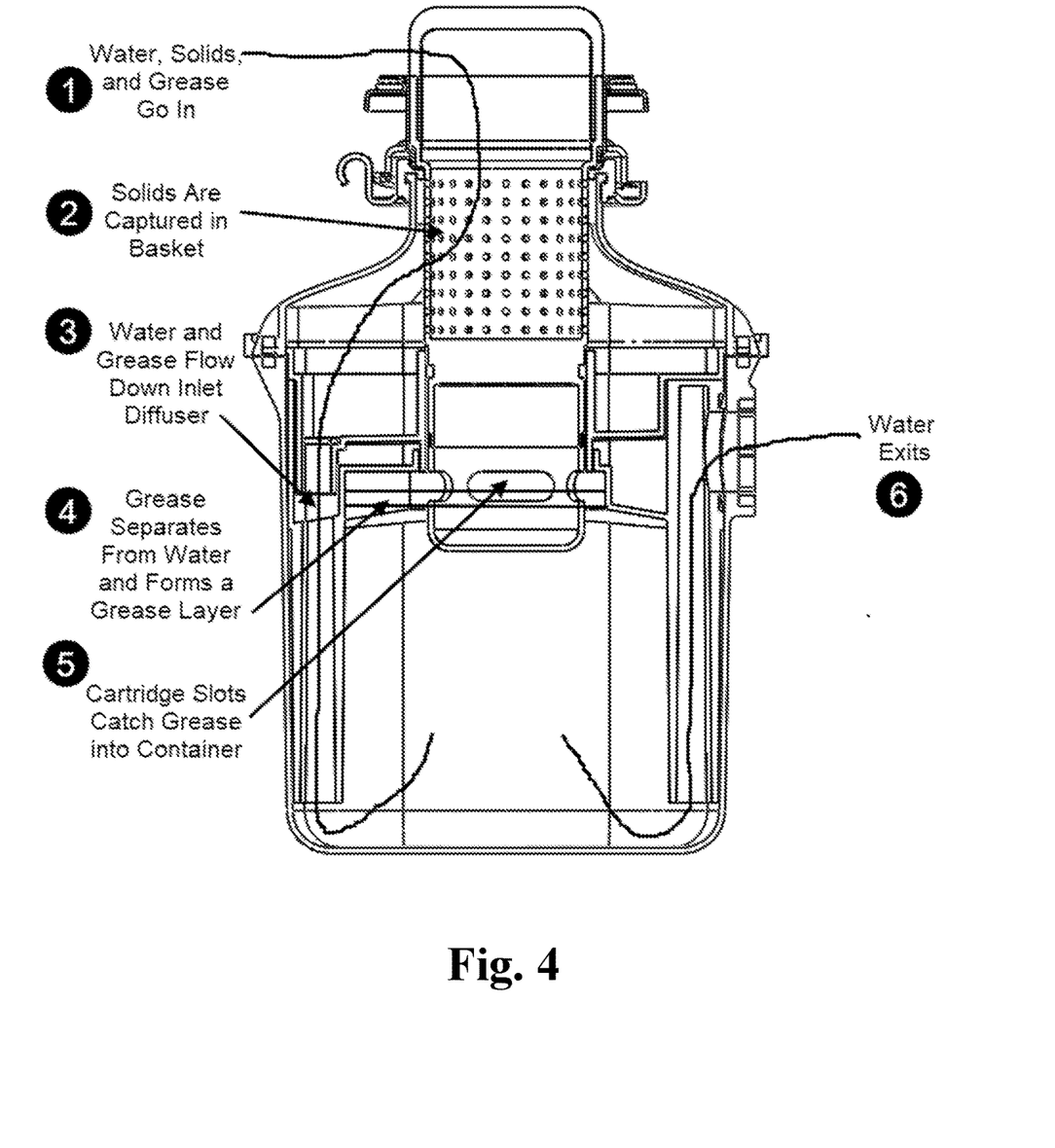
FIG. 4 is a schematic showing the operation of a grease and/or solids collection system in accordance with one embodiment of the present invention.

The general operation of the grease collection system 10 is shown in FIG. 4. Wastewater from the sink may include water, solids, grease, and/or other liquid or solid components.

(1) The wastewater is drained from the sink into the upper solids collection portion 70 of the insert cartridge 60.

(2) The solids collection portion 70 captures solids of a specified size, while the remaining liquid and smaller solids of the wastewater pass through holes 72 formed in the outer wall of the solids collection portion 70. In certain embodiments, the holes 72 have an average diameter of about 1 mm to about 10 mm, preferably about 1 mm to about 5 mm. The hole size can be selected depending on the desired solids removal, since solids having their largest dimensions greater than the diameter of the holes will be captured in the solids collection portion.

(3) The wastewater comprising water, grease, and/or smaller solids flowing through the solids collection portion 70 is directed into an upper opening 26 of the lower housing chamber 20, which may include an inlet diffuser 32a as shown. As the wastewater flows through inlet diffuser 32a toward the bottom of the lower housing chamber 20, grease begins to separate from water in the liquid phase.

(4) In the lower housing chamber 20, the grease separates from the water and rises to the top of the water line (due to the difference in density).

(5) The lower grease collection portion 80 of the insert cartridge 60 comprises slots 82 formed therein and generally residing in or above the water line. In certain embodiments, when grease removal is desired, the insert cartridge 60 can be plunged deeper into the lower housing chamber 20, for example by pushing down by the user with the handle 62 or by twisting the cartridge 60 on a threaded track. The slots 82 then drop below the grease line (but preferably above the water line), thus allowing grease to flow from the lower housing chamber 20 through the slots 82 and into the lower grease collection portion 80 of the cartridge 60.

In certain embodiments, the slots 82 of the insert cartridge 60 can reside or be maintained at a level approximately in the water line, such that any grease that is separated is passively spilled through the slots 82 and into the grease collection portion 80. Such a configuration avoids the need for plunging the cartridge 60 to "collect" grease, thereby requiring simple removal of the cartridge 60 for cleaning.

(6) The water portion of the separated wastewater flows from the bottom of the lower housing chamber 20 through a lower opening of the outlet diffuser 32b and out the outlet 22 of the lower housing chamber 20.

During operation, the grease collection system 10, and particularly the lower housing chamber 20, may be sealed (water-tight, preferably air-tight), so as to maintain a positive-pressure flow. In certain embodiments, a hole 31 can be present between the inlet diffuser 32a and lower housing chamber 20, which helps to keep the water pressure equalized. This helps to maintain a static wastewater level for grease removal. The solids and grease that have been collected in the cartridge 60 are removed from the sink by pulling the cartridge 60 out of the drain hole via a cartridge handle 62. As shown, handle 62 is positioned at the top end of the cartridge 60 and extends above the sink drain level such that it is visible and accessible from the top side of the sink. However, in alternative embodiments, the handle may be flush with the sink drain line or reside below the sink drain line.

Additional optional or preferred features of the grease and/or solids collection systems are described below. It should be understood that these features may be included individually or in combination with one or more other features described herein.

Gaskets

Figure 5:
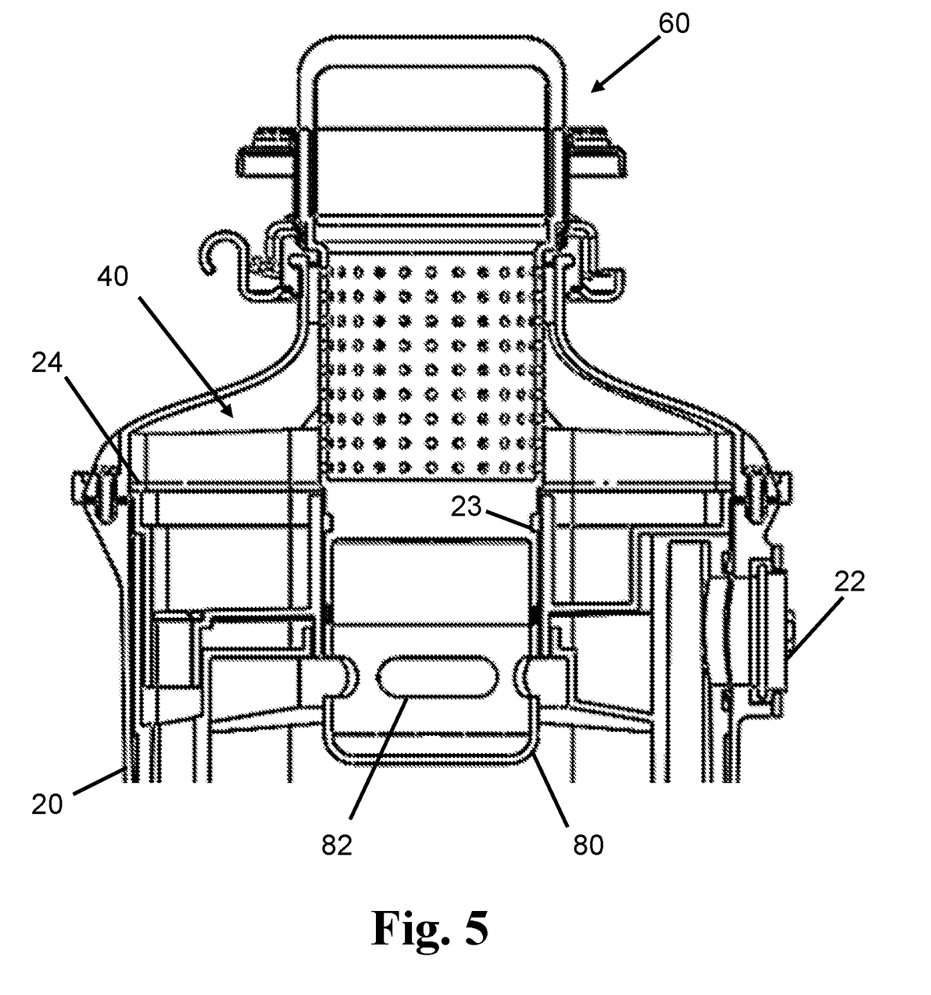
FIG. 5 is a partial cross-section view of a grease and/or solids collection system in accordance with one embodiment of the present invention.

In certain embodiments, the grease collection system may comprise one or more gaskets so as to provide water-tight and/or air-tight seals between various compartments and/or the external environment. As shown in FIG. 5, in certain embodiments, a cartridge gasket 23 may be positioned around at least a portion of the insert cartridge 60 that prevents or inhibits water from flowing through the slots 82 of the grease collection portion 80, and in certain embodiments, may also keep the lower housing chamber 20 pressurized. In certain embodiments, an outer gasket seal 24 is positioned at or near the sink drain to prevent or inhibit sewer gas from coming up out of the sink drain, for example if a P-Trap is not used in the plumbing system. The outer gasket 24 may also prevent or inhibit water in the upper chamber 40 from bypassing through the outlet 22. In certain embodiments, the cartridge gasket 23 and outer gasket 24 can be a one-piece construction, although these features may also be configured as separate gaskets.

Figure 6:
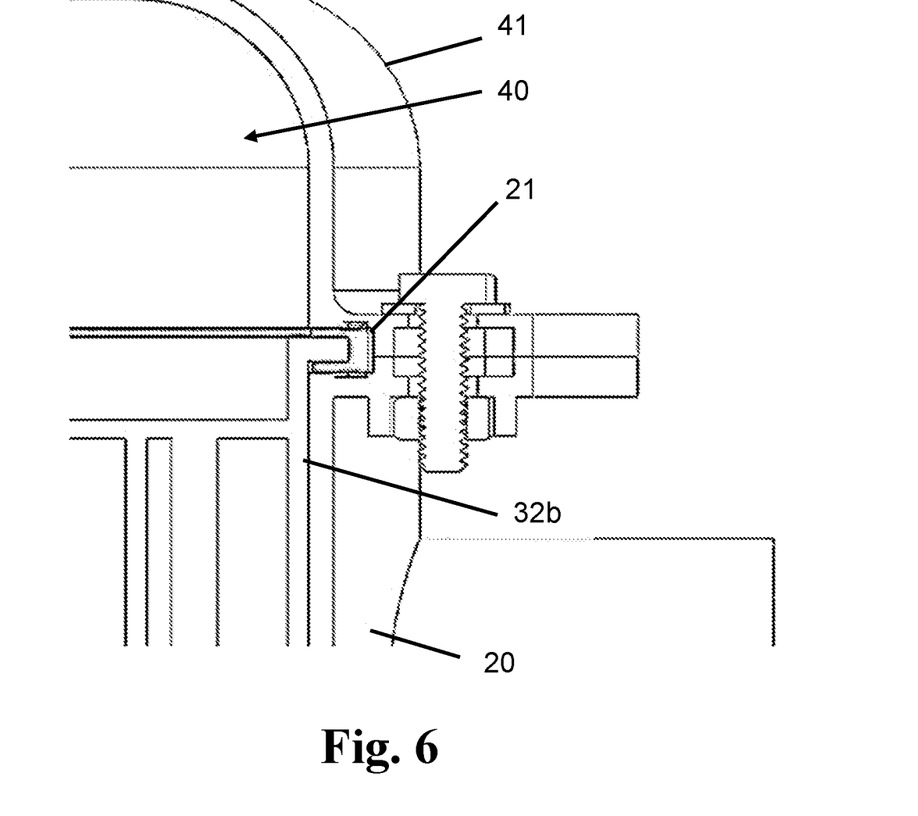
FIG. 6 is a partial cross-section view of a grease and/or solids collection system in accordance with one embodiment of the present invention.

An alternative embodiment is shown in FIG. 6. As shown in FIG. 6, a double-sided gasket 21 may be included between diffuser insert 32b (and/or 32a) and one or more other components. For example, gasket 21 may be positioned between the diffuser insert 32a, 32b and the lid 41 defining upper chamber 40 and/or between the diffuser insert 32a, 32b and lower chamber 20. The seal between the lid 41 and the diffuser insert 32a, 32b can seal off water that enters from the sink basin through the sink hole and solids collection portion. The seal between the insert 32a, 32b and the lower chamber 20 can seal off water and sewer gas that are inside the lower chamber 20.

System Installation, Operation, and Insert Removal

Figure 7:
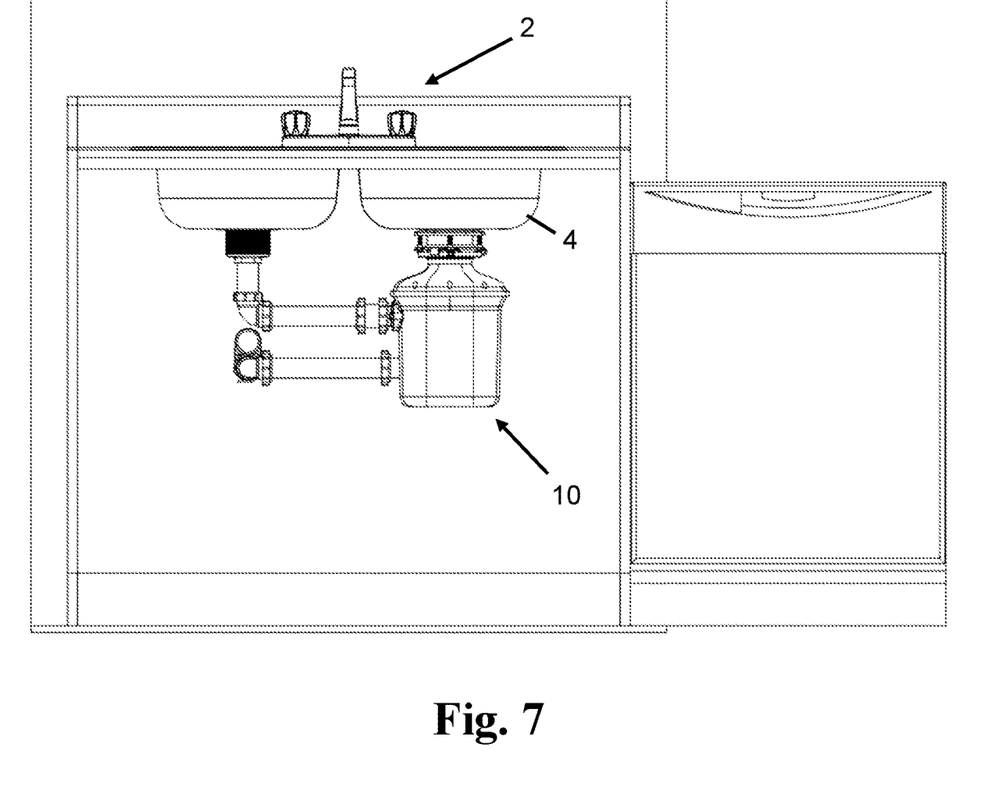
FIG. 7 is a front view of a sink comprising a grease and/or solids collection system installed thereon, in accordance with one embodiment of the present invention.

The grease and/or solids collection system is generally configured to be installed below a sink. As shown in FIG. 7, grease and/or solids collection system 10 may be installed below a sink 2 comprising a sink basin 4. System 10 is generally coupled to the sink basin 4 using an attachment mechanism, which may include a 3-bolt attachment, threaded attachment, or other mechanisms known in the art. In certain embodiments, the grease and/or solids collection system 10 may be secured directly to a drain hole 6 in the sink basin 4, such that there are no pipes or hoses fluidly connecting the drain 6 and the wastewater chamber(s) of system 10. Insert cartridge 60 may be installed by inserting through the drain hole 6.

Figure 8A:
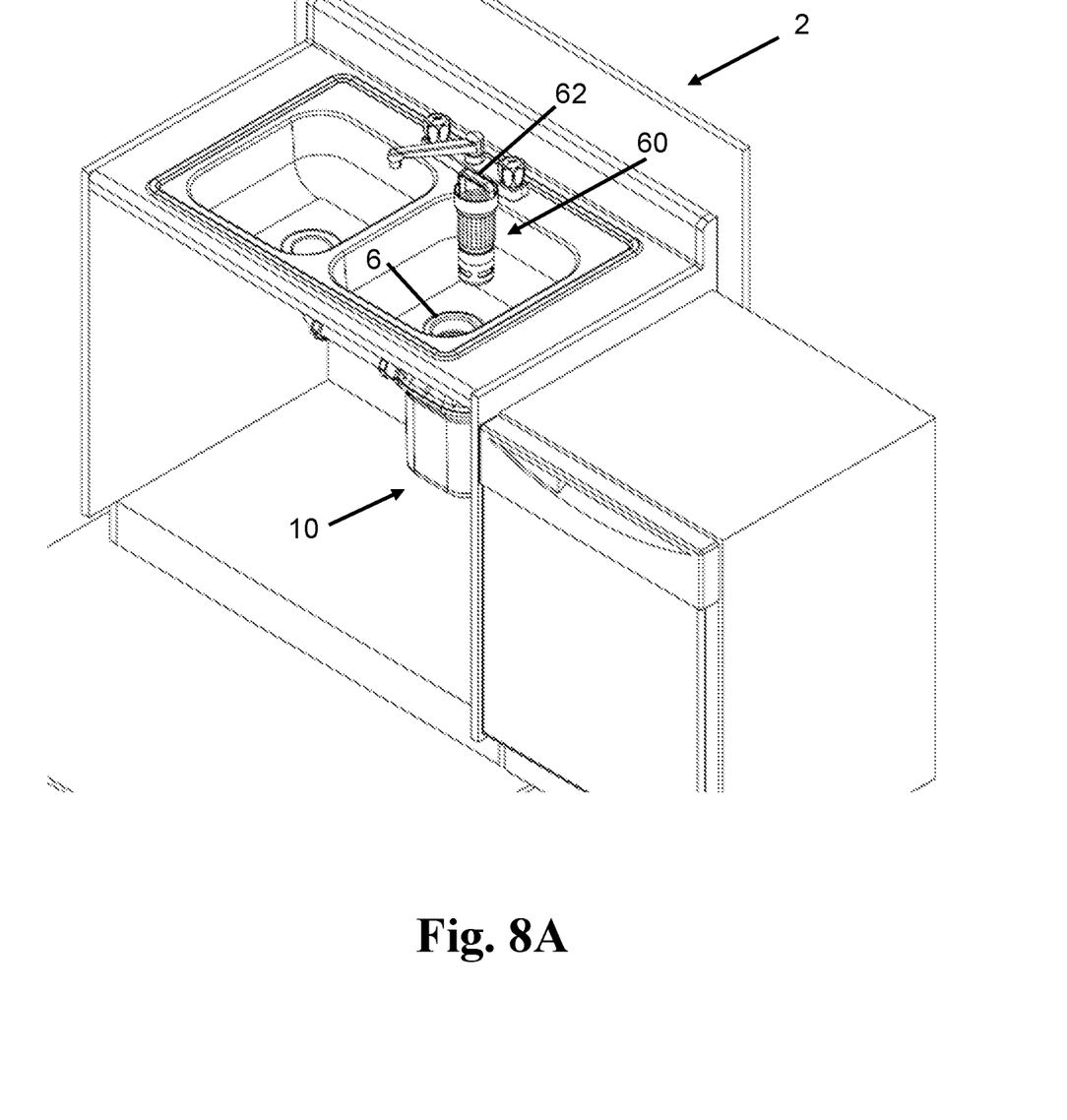
FIG. 8A is a perspective view of a sink comprising a grease and/or solids collection system with the insert cartridge removed, in accordance with one embodiment of the present invention.
Figure 8B:
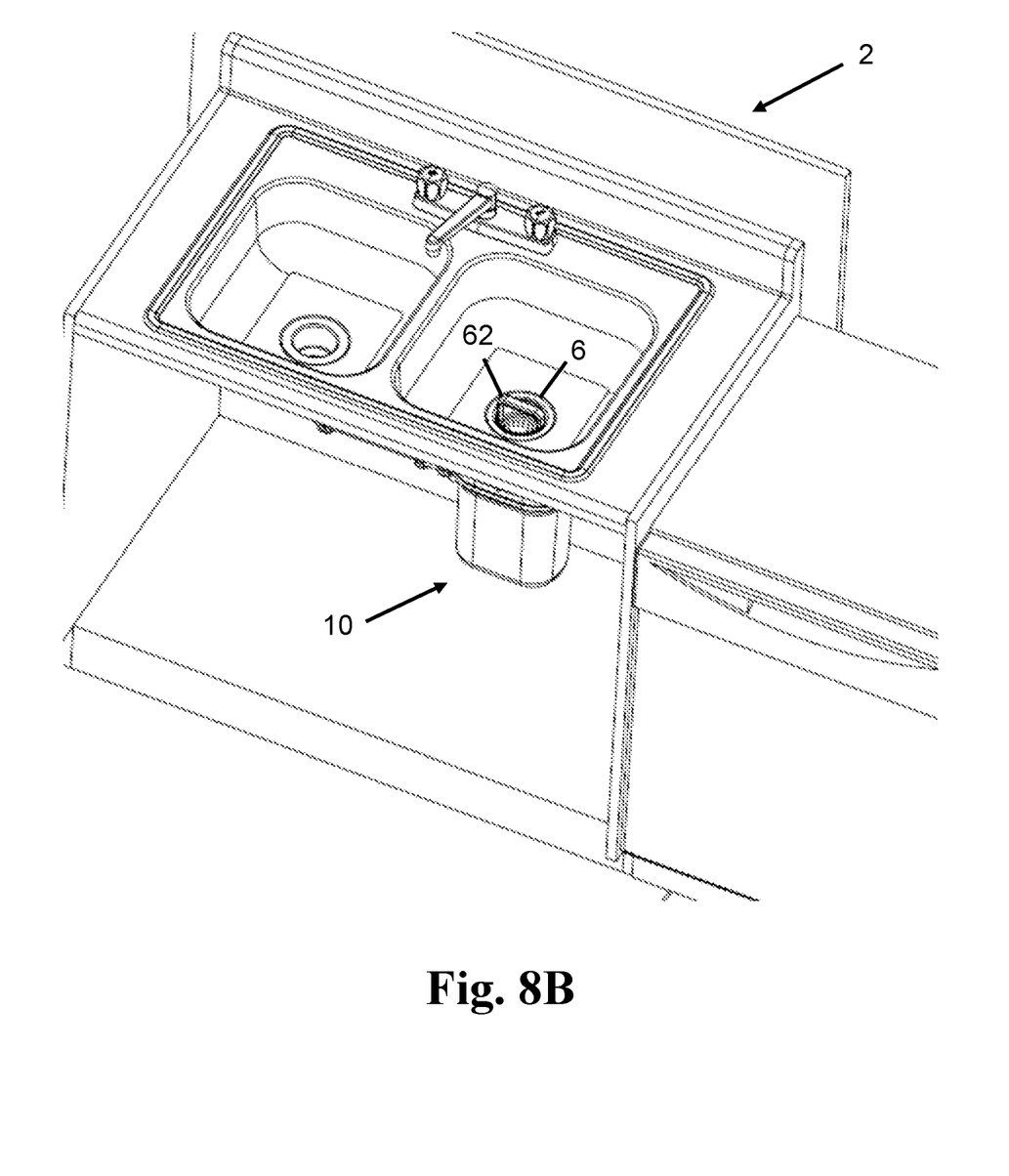
FIG. 8B is a perspective view of a sink comprising a grease and/or solids collection system with the insert cartridge installed (or re-installed), in accordance with one embodiment of the present invention.

During operation, wastewater from the sink basin 4 drains through hole 6 and into system 10. Grease and/or solids contained within the wastewater are collected in the appropriate portion of cartridge 60. As shown in FIG. 8A, the collected grease and/or solids may be removed from the system by lifting and removing cartridge 60 through the drain hole 6. For example, a user may grab the handle 62 to lift and remove cartridge 60. The collected grease and/or solids may be emptied from cartridge 60 and reinstalled in system 10 by inserting through the drain hole 6.

In certain embodiments, for example commercial applications, the grease and/or solids collection system will need to be larger than illustrated in the figures herein in order to pass the ASME 112 Grease Interceptor standard. The larger size will become very heavy on the sink drain. Therefore, the system can stand on the floor below the sink basin.

It should be understood that the grease and/or solids collection systems in accordance with embodiments of the present invention may have a variety of sizes and geometries other than those expressly shown and described herein.

It should still further be understood that the grease and/or solids collection systems in accordance with embodiments of the present invention may be formed of a variety of suitable materials, including polymers or plastics, metals, composites, and the like (e.g., fiberglass reinforced composites, etc.) using any suitable method for preparing the structures described herein.

Although the figures and above description present features of preferred embodiments of the present inventive concept, other preferred embodiments may also be created in keeping with the principles of the invention. Furthermore, these other preferred embodiments may in some instances be realized through a combination of features compatible for use together despite having been presented independently in the above description.

Furthermore, unless otherwise specified, any directional references (e.g., upper, lower, above, below, etc.) are used herein solely for the sake of convenience and should be understood only in relation to each other. For instance, a component might in practice be oriented such that faces referred to as "upper" and "lower" are sideways, angled, inverted, etc. relative to the chosen frame of reference.

The preferred forms of the invention described above are to be used as illustration only and should not be utilized in a limiting sense in interpreting the scope of the present inventive concept. Obvious modifications to the exemplary embodiments, as hereinabove set forth, could be readily made by those skilled in the art without departing from the spirit of the present inventive concept.

Embodiments of the present invention provide a number of advantages over prior art systems. For example, the grease collection system comprises a single unit that can be added to existing traditional grease trap to add capacity and lengthen the pump out cycle, or simply installed beneath a sink in place of a traditional grease trap, thereby providing versatility of application. Additionally, the system can be designed to work as a gas trap with no need for an external p-trap. The system is advantageously capable of handling the full flow of a standard kitchen or commercial sink when the stopper is unplugged. In certain embodiments, the solids collection basket capacity can be designed for the particular application such that when it is full the grease collection portion of the cartridge should also be emptied.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than or equal to about 10" (with no upper bounds) and a claim reciting "less than or equal to about 100" (with no lower bounds).

We claim:

1. A grease and solids collection system configured to be coupled with a sink basin, the system comprising:
   a wastewater chamber configured to be secured to the sink basin; and
   a grease and solids collection insert configured to be installed within the wastewater chamber and removed through a drain in the sink basin, wherein the insert comprises an upper solids collection portion and a lower grease collection portion wherein the lower grease collection portion comprises one or more slots formed therein.

2. The system of claim 1, wherein the upper solids collection portion comprises a plurality of holes formed therein.

3. The system of claim 2, wherein the holes have an average diameter of about 1 mm to about 10 mm.

4. The system of claim 1, wherein the insert comprises a handle configured to be grabbed by a user removing the insert from the wastewater chamber.

5. The system of claim 4, wherein the handle is flush with the drain or extends above the drain when the insert is installed within the wastewater chamber.

6. A sink comprising a sink basin and the grease and solids collection system of claim 1 installed below the sink basin.

7. The sink of claim 6, wherein the grease and solids collection system is secured directly to a drain in the sink basin such that there are no pipes or hoses fluidly connecting the drain and the wastewater chamber.

8. A grease and/or solids collection system configured to be coupled with a sink basin, the system comprising:
   a wastewater chamber configured to be secured to the sink basin and comprising an upper housing chamber and a lower housing chamber, the lower housing chamber comprising one or more diffusers for directing the flow of wastewater through the system; and
   a grease and/or solids collection insert configured to be installed within the wastewater chamber and removed through a drain in the sink basin.

9. The system of claim 8, wherein the insert resides in the upper housing chamber and extends at least partially into the lower housing chamber when installed.

10. The system of claim 8, further comprising one or more gaskets positioned between at least a portion of the one or more diffusers and the upper housing chamber and/or the lower housing chamber, thereby providing a water-tight and/or air-tight seal between the upper housing chamber and the lower housing chamber.

11. The system of claim 8, wherein the lower housing chamber comprises one or more effluent outlets for removing de-greased water from the system and/or one or more secondary inlets for receiving wastewater.

12. A method of collecting grease from wastewater, the method comprising:
   draining wastewater into a grease collection system coupled with a sink basin, the system comprising:
     a wastewater chamber secured to the sink basin, and
     a grease collection insert installed within the wastewater chamber;
   lowering the insert into the wastewater chamber, thereby submerging one or more slots formed in the insert and allowing grease to collect in the insert; and
   removing the insert through a drain in the sink basin, thereby removing a quantity of grease collected during the draining.

13. The method of claim 12, wherein the insert comprises an upper solids collection portion and a lower grease collection portion.

14. The method of claim 13, wherein removing the insert removes from the system a quantity of solids collected in the upper solids collection portion and the quantity of grease collected in the lower grease collection portion.

15. The method of claim 14, further comprising emptying at least a portion of the quantity of grease and at least a portion of the quantity of solids from the removed insert and reinstalling the insert into the wastewater chamber through the drain in the sink basin.

16. The method of claim 12, wherein the insert comprises a handle, wherein removing the insert comprises grabbing the handle and raising the insert.

17. A method of collecting grease from wastewater, the method comprising:
   draining wastewater into a grease collection system coupled with a sink basin, the system comprising:
     a wastewater chamber secured to the sink basin, and
     a grease collection insert installed within the wastewater chamber and comprising one or more slots formed therein so as to allow a quantity of grease separating from the wastewater to flow into the insert and collect therein; and
   removing the insert through a drain in the sink basin, thereby removing the quantity of grease collected during the draining.

18. The method of claim 17, wherein the insert comprises an upper solids collection portion and a lower grease collection portion.

19. The method of claim 18, wherein removing the insert removes from the system a quantity of solids collected in the upper solids collection portion and the quantity of grease collected in the lower grease collection portion.

20. The method of claim 19, further comprising emptying at least a portion of the quantity of grease and at least a portion of the quantity of solids from the removed insert and reinstalling the insert into the wastewater chamber through the drain in the sink basin.

* * * * *